United States Patent Office 2,698,351
Patented Dec. 28, 1954

2,698,351

PURIFICATION OF PHOSPHORIC ACID POLYMER FEED STOCK

Chauncey C. Hale, Cranford, N. J., assignor to Standard Oil Development Company, a corporation of Delaware No Drawing. Application December 22, 1950, Serial No. 202,423

4 Claims. (Cl. 260—683.15)

This invention relates to the polymerization of olefins, and relates more particularly to the polymerization of normally gaseous olefins to liquid hydrocarbons comprising essentially aliphatic polymers or copolymers suitable for use in the manufacture of motor fuel.

It is well known to convert the olefinic content of cracked gases into gasoline by the use of solid granular cataylsts containing acids of phosphorus. A type of catalyst which has extensive use commercially is the so-called solid phosphoric acid catalyst as disclosed in U. S. Patent No. 1,993,513 and others. This solid phosphoric acid catalyst may be made by the successive steps of (1) mixing the phosphoric acid with a finely divided and relatively inert carrying material such as, for example kieselguhr to form a rather wet paste (the acid ordinarily being in major proportion by weight); (2) calcining at temperatures of the order of 400–500° C. to produce a solid cake; (3) grinding and sizing to produce particles of a usable mesh; (4) rehydrating the catalyst granules at temperature of the order of 260° C. to produce an acid composition corresponding to optimum polymerizing activity.

In utilizing catalysts of the above type it has been found that they are easily poisoned by the presence of nitrogen compounds that fall in the boiling range of the feed gases. Hydrogen cyanide has been identified as being present and is probably the major nitrogen component. Cyanogen and hydrogen thiocyanide may be present but have not been clearly identified. Basic type nitrogen or that which will react with a dilute solution of sulfuric acid (probably only ammonia) has been found to be a minor component of the order of 10–15% of the total nitrogen content. These materials are found particularly in those feed stocks obtained by the cracking of nitrogen-containing crudes or crude distillates. In order to keep these poisons at a low level it has been the practice to contact the feed gases with caustic and then with water to remove the caustic. However experience has indicated this operation to be unreliable for producing a constant purity feed stock.

According to the present invention it has been found that the nitrogen poisons in the feed can be removed by passing the feed through a bed of silica gel at ordinary temperatures.

The process of the present invention is applicable to any type of olefin-containing gas mixture which is found by trial to contain nitrogen type compounds which will react with phosphoric acid at reactor temperature (usually 450° F.+). Thus it can be utilized to purify the total gas mixtures from cracking plant receivers (which occasionally have a large enough content of propene and the butenes to render them suitable for catalytic polymerization processes), it can be applied also to special fractions relatively high in propene-butene content such as are commonly known as stabilizer refluxes, and it is also applicable to still more closely cut fractions consisting substantially only of butanes and butenes which are charging stock to plants operating to produce octenes hydrogenatable to iso-octanes having antiknock value.

It is possible to reduce the nitrogen content by percolating the feed in liquid phase through a bed of the silica gel but the bed soon becomes fouled and the nitrogen compounds are later displaced with the result that the nitrogen content of the effluent has a higher nitrogen content than the feed. This is well shown by the following data:

*Silica gel percolation of poly plant feed*

[$C_4$ Feed, 10 v./hr.]

|  | Nitrogen, p. p. m. |
|---|---|
| Feed | 7 |
| Spot sample of effluent: | |
| After 60 v./v | 0.6 |
| After 195 v./v | 0.5 |
| After 260 v./v | 9.1 |
| After 500 v./v | 8.9 |
| Spent silica gel analyses: | |
| First third | 494 |
| Middle third | 435 |
| Last third | 662 |

It is apparent from the data in the above table that for about 200 total v./v., the removal of nitrogen compounds from the poly feed by the silica gel is quite good. By the time that 260 v./v. had been percolated, however, the nitrogen content of the effluent increased to a value higher than the feed stock. This indicates that something in the feed, in lower concentration and/or more preferentially held by the silica gel than the nitrogen compounds, displaced nitrogen compounds from the gel. This hypothesis is borne out by the nitrogen contents of the gel removed from different parts of the bed. As shown in the table, the gel near the outlet has a much higher nitrogen content, indicating that some of the nitrogen has been displaced from the front end of the bed.

On the other hand if the feed material is treated to remove water and methyl mercaptan and then passed in the vapor phase through a fluid bed of silica gel the nitrogen content is materially reduced without fouling of the bed, and subsequent displacement into the effluent gas. For example, the nitrogen content of an olefinic gas feed was reduced from 7.9 to 0.15 p. p. m. when the feed was first dehydrated and then passed in the vapor phase through a fritted disk supporting a fluid bed of 200 mesh silica gel. The efficiency of the gel fell off very little even after 70 cubic feet of gas had passed through it.

In a second test a $C_4$ feed containing water, methyl mercaptan and 11.9 p. p. m. of nitrogen was dried by passing through anhydrous calcium sulfate and then passed through a solution of copper oleate in heptane to remove the methyl mercaptan. The anhydrous and methyl mercaptan-free feed was then passed downwardly through a vertical tube 20″ x 19/32″ containing 83 ml. of 28–200 mesh silica gel at the rate of 0.5 cu. ft. per hour with the following results:

| Accumulated Time, hrs. | Accumulated Gas Volume, ft. | Nitrogen Content of Effluent Gas, p. p. m. |
|---|---|---|
| 3 | 1.75 | 0.63 |
| 11 | 5.5 | 0.97 |
| 18 | 9.25 | 0.86 |
| 24 | 12.25 | 0.80 |
| 31 | 15.34 | 0.77 |
| 47 | 23.75 | 0.72 |
| 61 | 30.75 | 0.47 |
| 101 | 50.75 | 0.70 |
| 144 | [1] 72.25 | 0.00 |

[1] 9 liters of liq. $C_4$ or about 110 vols. of liq. $C_4$/vol. of $SiO_2$.

It is evident from the above data that the preliminary removal of both methyl mercaptan and water enabled the nitrogen compounds to be almost completely removed from the feed material.

The nature of the present invention having been thus fully set forth and specific examples of the same given, what is claimed as new and useful and desired to be secured by Letters Patent is:

1. The method of removing nitrogen compounds from a stream of low-boiling hydrocarbons containing small amounts of water, mercaptans and nitrogen compounds, which comprises contacting the hydrocarbons containing nitrogen compounds with silica gel at conditions adapted to adsorb said nitrogen compounds on said gel, said water and mercaptans being removed from said stream before said stream contacts silica gel.

2. A method as in claim 1 wherein said stream comprises normally gaseous olefins.

3. A method as in claim 2 wherein said stream is contacted in the vapor phase with said silica gel at ordinary temperatures.

4. A method as in claim 2 wherein said stream, after having been contacted with silica gel, is further contacted with a phosphoric acid-containing catalyst under olefin polymerization conditions whereby said normally gaseous olefins are converted to normally liquid polymers.

References Cited in the file of this patent

UNITED STATES PATENTS

| Number | Name | Date |
|---|---|---|
| 2,042,053 | Hoover | May 26, 1936 |
| 2,216,549 | Deanesly | Oct. 1, 1940 |
| 2,384,311 | Kearby | Sept. 4, 1945 |
| 2,441,572 | Hirschler et al. | May 18, 1948 |
| 2,456,119 | Friedman et al. | Dec. 14, 1948 |
| 2,457,146 | Grote et al. | Dec. 28, 1948 |